March 25, 1930. B. L. BOBROFF 1,751,972
HOSPITAL SIGNALING SYSTEM
Filed Nov. 17, 1924 3 Sheets-Sheet 1
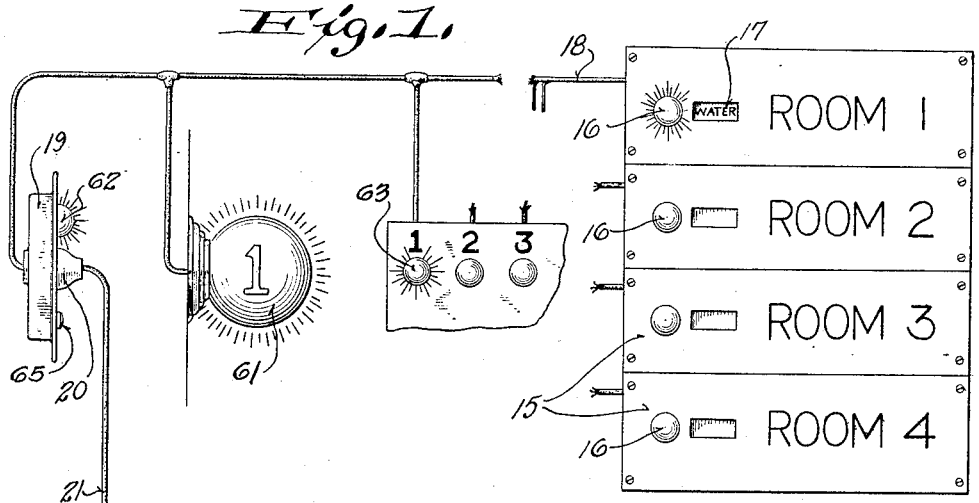
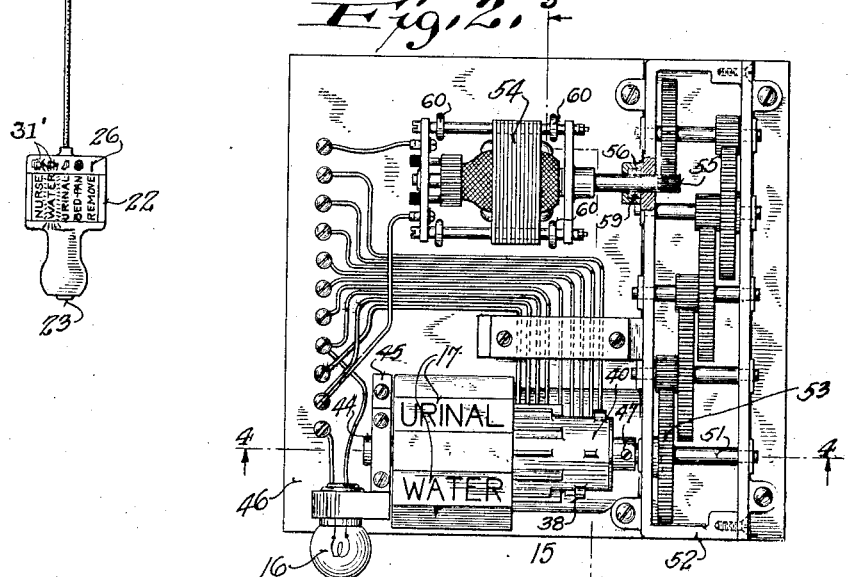
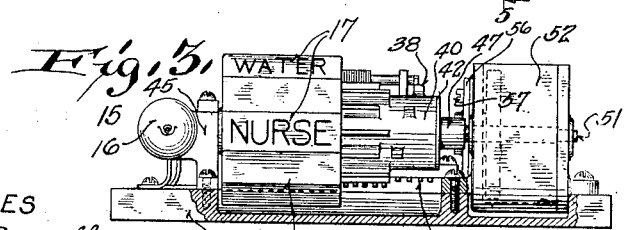
WITNESSES
George Mueller
M. E. Downey
INVENTOR.
Bennett L. Bobroff
By R. S. Caldwell
ATTORNEY.

March 25, 1930.  B. L. BOBROFF  1,751,972
HOSPITAL SIGNALING SYSTEM
Filed Nov. 17, 1924  3 Sheets-Sheet 2
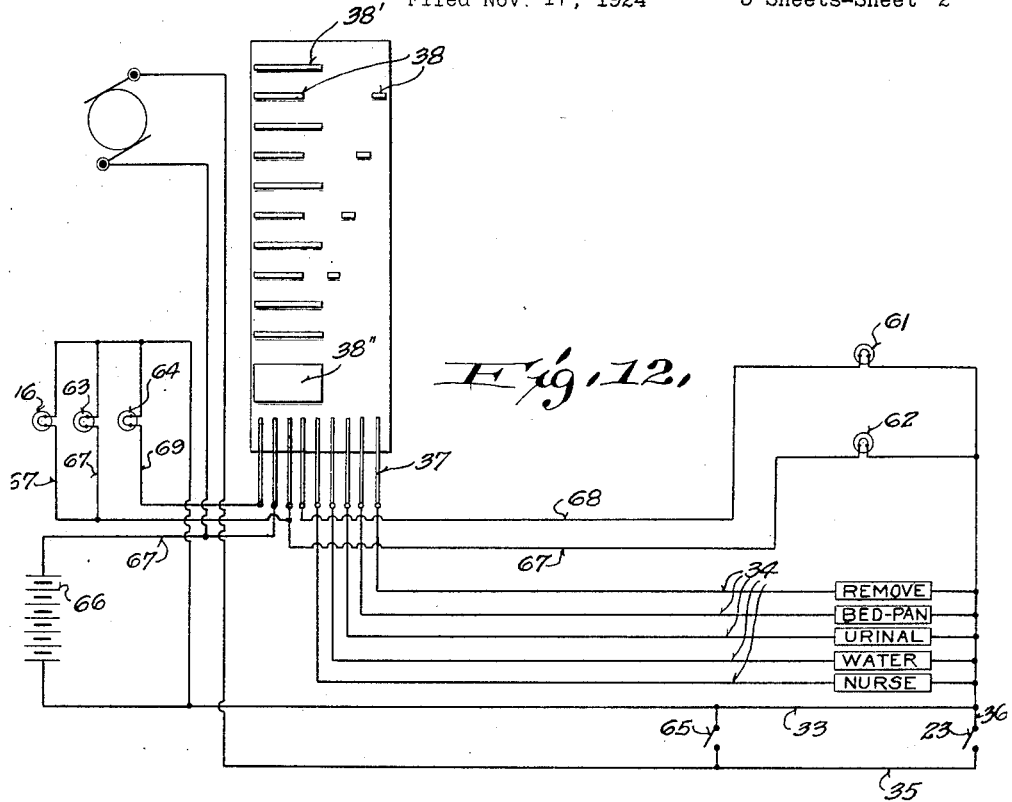
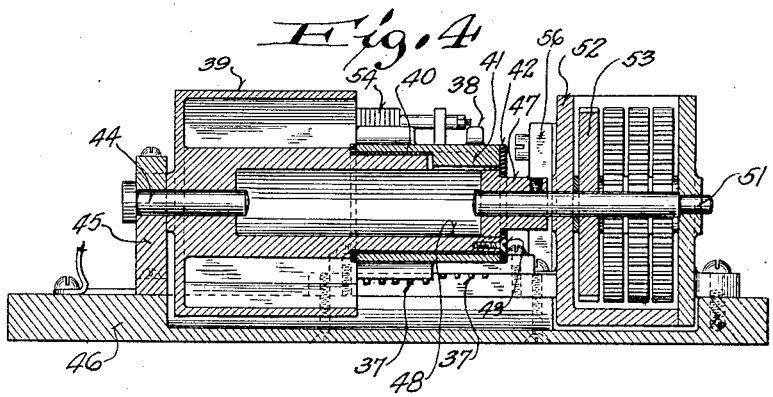
WITNESSES
George Mueller
M. E. Downey
INVENTOR.
Barnett L. Bobroff
By R. S. Caldwell
ATTORNEY.

March 25, 1930.   B. L. BOBROFF   1,751,972
HOSPITAL SIGNALING SYSTEM
Filed Nov. 17, 1924   3 Sheets-Sheet 3
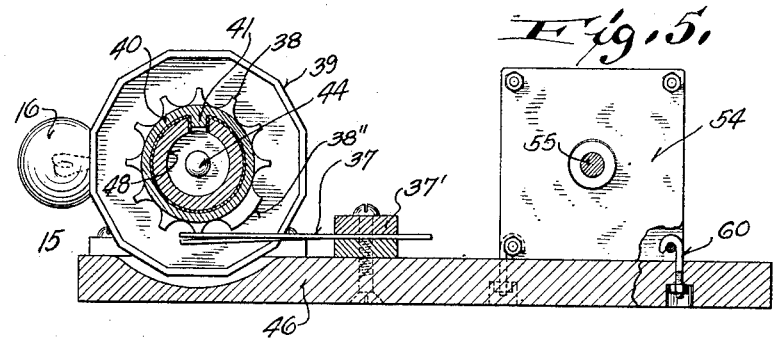
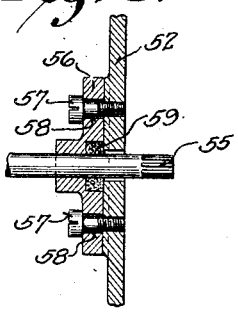
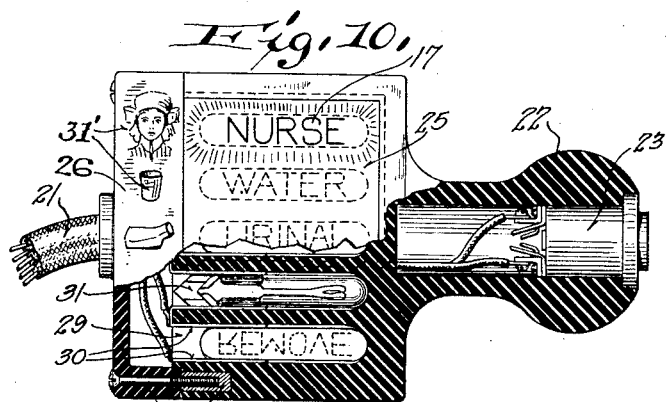
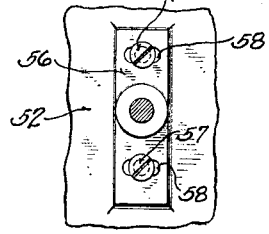
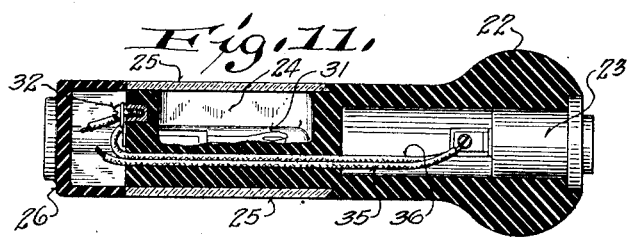
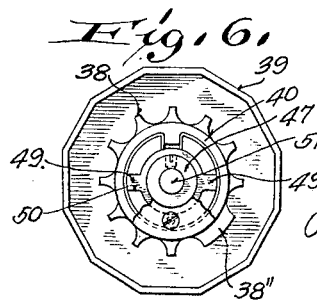
WITNESSES
George Mueller
M. E. Downey
INVENTOR.
Bornett L. Bobroff
By R. S. Caldwell
ATTORNEY.

Patented Mar. 25, 1930

1,751,972

UNITED STATES PATENT OFFICE

BORNETT L. BOBROFF, OF MILWAUKEE, WISCONSIN

HOSPITAL SIGNALING SYSTEM

Application filed November 17, 1924. Serial No. 750,302.

The invention relates to signaling systems for hospitals, sanitariums and other institutions and contemplates the provision of means whereby any one of a number of signals may be transmitted for indication on an annunciator.

An object of the invention is to provide such a system with a motor-driven annunciator adapted to have its annunciator drum rotated as long as the transmitting push button remains closed, and adapted in each of its signaling positions to close a circuit indicating at the sending station the signal which is displayed thereby, one of said signal indications being recurrently displayed between the other signal indications so that an important signal indication may be effected without traversing the entire cycle of operation necessary for effecting the other signal indications.

Another object of the invention is to provide a signaling system of this character in which the annunciator may be constructed in a small compass to permit of compact grouping of several annunciator units.

A further object of the invention is to effect improvements over the signaling system disclosed in my United States Patent No. 1,367,583 entitled "Systems for signaling".

With the above and other objects in view, the invention consists of the several features hereinafter set forth and more particularly defined by the annexed claims.

In the accompanying drawings, Fig. 1 is a diagrammatic illustration of a hospital signaling system embodying the present invention;

Fig. 2 is a top plan view of one of the annunciators;

Fig. 3 is a front elevation thereof, parts of the base being shown in section;

Fig. 4 is a sectional view taken on the line 4—4 of Fig. 2;

Fig. 5 is a sectional view taken on the line 5—5 of Fig. 2;

Fig. 6 is an end view of the annunciator drum and its drive coupling;

Fig. 7 is a detail perspective view of the drum coupling;

Fig. 8 is a detail sectional view showing a bracket for laterally adjusting the motor shaft;

Fig. 9 is a front view of the bracket of Fig. 8;

Fig. 10 is a plan view, partly in section, of the push button holder;

Fig. 11 is a longitudinal sectional view thereof; and

Fig. 12 is a diagram of the circuit connections of one annunciator unit.

In the drawings 15 indicates a row of annunciator units of which there is one for each room, or one for each bed where there is more than one bed in a room. These annunciators may be designated with room numbers or with bed numbers, and are provided with signal lamps 16 and openings through which name faces 17 are shown whenever signals are given, such name faces exhibiting through the openings in the annunciator fronts the name of whatever is signaled for by the patient.

Each annunciator unit is connected by a cable 18 with an outlet box 19 in the wall of the room indicated on the annunciator front or close to the bed so indicated. An attachment plug 20 is adapted to fit in a suitable socket provided for it in the outlet box 19 to establish connection between the various wires of the cable 18 and corresponding wires in a flexible cable extension 21, the plug being adapted to fit in the outlet box 19 in only the one position in which the proper connections are established. A push button holder 22, preferably in the form of a pear push button with a flat indicating portion as shown, is attached to the end of the cable extension 21 and is provided with a push button 23 at its end and a row of indicating lamp slots 24 through its flat indicating portion covered on opposite sides by translucent glass plates 25 having the names of the various needs of the patient marked thereon.

The push button 22 preferably consists of the body portion and a removable cap 26 which is secured thereto by means of screws 27 threaded into bushings 28 embedded in the molded insulating material of which the body portion is formed. Each of the slots 24 communicates with a circular opening 29 at the end of the body portion where diametrically opposite lamp terminals 30 extend along the sides of the opening to form lamp sockets for receiving small indicating lamps 31, the lamp terminals 30 being secured to the flat end of the body portion and push button holder by means of screws 32 threaded into bushings or studs.

The end of the cable extension 21 passes through a central opening in the cap 26 and its wires are separated and connected with the various terminals, a common wire 33 connecting each of the lamps while other wires 34 connect the individual lamps, and a wire 35 passes through an opening in the body portion to the push button 23. The other wire 36 from the push button connects with the common connecting wire 33 so that the latter wire constitutes a common return for the push button circuit as well as for each lamp circuit.

Besides enclosing the wiring connections the cap 26 serves to retain the beveled glass slides 25 in the undercut grooves of the body portion. The glass slides are preferably translucent so that the designations contained therebeneath will only be in evidence when illuminated by the indicating lamps. In addition to the lamps suitable pictorial designations 31', as a picture of a nurse, a glass of water, etc., may be placed on the cap or holder opposite the lamps so that the signals may be more readily understood by illiterates.

Each of the indicating lamps 31 with its respective wire 34 and the common return wire 33 forms a separate lighting circuit controlled by the engagement of spring fingers 37 with contact ribs 38 on the annunciator drum 39 carrying the name faces 17, the contact ribs being preferably carried on a separate sleeve member 40 which is insulated from the annunciator drum 39 but connected therewith in driving relation by a tongue and slot connection 41 and an insulating end washer 42 secured to the end of the drum 39 by screws 43. The annunciator drum is disposed to rotate preferably on a horizontal axis, and for this purpose the drum turns at one end on a pivot pin 44 clamped in a standard 45 secured to the base member 46 of the unit. The drum is driven by coupling member 47 adapted to supportingly fit within the other end of the drum in a bore 48 and provided with oppositely projecting lugs 49 entering slots 50 in the drum. The coupling member is secured to a shaft 51 journalled in opposite sides of a gear casing 52 and carrying a gear wheel within the casing forming part of a gear train 53 extending rearwardly of the drum.

A motor 54 has gear teeth cut into the end of its projecting armature shaft 55 which extends into the gear casing and is journalled in a bracket 56 by which it may be laterally adjusted to effect proper meshing with its mating gear in the gear train 53. For this purpose the bracket 56 is mounted on the side of the gear casing 52 by screws 57 passing through slots 58 of the bracket, a felt packing 59 being suitably disposed in the bracket to retain lubricant in the gear casing. The motor 54 is suitably secured to the base 46 by hook-bolts 60 or other suitable fastening means.

The base member 46 is suitably recessed to receive the drum 39 in order to reduce the height of the unit, and the gear train connecting the drum with the motor is so disposed as not to project above the drum, in order to obtain a unit which may be compactly tiered with other similar units.

The motor 54 is operated by closing the push button 23 and serves to slowly rotate the drum 39 to bring the name faces 17 successively in position for display through the opening in the annunciator front. At the same time the turning of the drum causes the operation of the switches controlling the circuits through the indicating lamps 31 in such a way that a circuit will be closed through that lamp 31 which illuminates the name on the push button holder corresponding with the name shown through the opening of the annunicator front. For this purpose the contact ribs 38 on the annunciator drum engage with the spring fingers 37 arranged in a row on an insulating support 37' secured to the base member 43. There is one contact finger for each indicating lamp and others for controlling signal circuits to different parts of the building where it is desired to indicate that a signal has been given. These auxiliary lighting circuits are desired to be closed in each signaling position of the annunciator drum and the contact ribs 38 are accordingly alike as to that portion necessary for the operation of such circuits. The other portions of the ribs are in stepped relation for causing the indicator lamps to be operated successively. The so-called auxiliary signal lamps controlled by the portions of the contact ribs which are in common may include the annunciator signal light 16, a room light 61 above the door of the patient's room, a wall box light 62 in the wall box 19, a light 63 in the superintendent's office, and one or more other lights 64 in the supply room or wherever it is desired to display the signal.

In order to insure attention to the patient when he is so weak that he is only able to momentarily depress the push button, auxiliary contact ribs 38' are interposed between the contact ribs 38 in order to establish a circuit for effecting a "nurse" indication alternately with each of the other signals. On parts of the contact sleeve corresponding to the interval between the complete cycle of operation a contact pad 38'' is provided to effect an additional "nurse" indication. The blank places between the contact ribs are accordingly relatively short and several "nurse" indications may be obtained during a single revolution of the annunciator drum, thus avoiding the necessity for completely rotating the drum to effect such indication.

In addition to the push button switch 23 for closing the motor circuit to set the annunciator in operation, there is another push button 65 on the wall plate 19, which is to be pressed by the nurse when responding to the signal to cause the annunciator to move to the succeeding blank position in which there is no name appearing through the opening of the annunciator front plate and in which there is no indicating lamp circuit closed. It will be seen that this leaves the annunciator drum in a position to produce a "nurse" indication upon holding the push button 23 depressed for a relatively short period of time, such as would be done by a patient in comparatively weak condition. The flashing of the lamp 16 is then a sufficient indication of the wants of the patient.

In the schematic wiring diagram of Fig. 12 the various parts are as above described and the battery or other source of electric current supply 66 is shown with one terminal connected with the common return wire 33 and the other terminal connected by a wire 67 with one of the spring contact fingers 37 and with one terminal of the motor 54, the other terminal of which is connected with the wire 35 from push buttons 23 and 65. The contact fingers connected to the battery and to the group of lights which operate simultaneously may be of suitable increased width over that of the other contact fingers to insure the necessary current-carrying capacity.

In the normal or blank position of the annunciator drum 39 as shown in the diagram, none of the contact fingers 37 are engaged by the contact ribs 38 or 38' and consequently none of the lights are burning. When, however, the patient is desirous of attention, he presses the push button 23 which closes the circuit through motor 54 causing the annunciator drum to be slowly rotated by means of the intermediate gear train and bringing the contact ribs 38 and 38' successively into engagement with the common contact fingers 37 and also the contact fingers for the respective indicating lamps 31. This causes the indicating lamps 31 to flash up successively, the "nurse" indication recurring after each of the other indications, and at the same time lights the lamp 62 in the wall box 19, the lamp 61 at the door of the room, the lamp 16 on the annunciator for that room, the lamp 63 in the superintendent's office, and one or more lamps 64 in other parts of the building. The lighted indicating lamp 31 in the push button holder indicates to the patient the signal which he has caused to be displayed on the annunciator and if that is not the signal desired to be given he merely holds the push button 31 depressed while successive signal lamps are lighted until the desired signal is indicated. He then removes his finger from the push button, thus opening the motor circuit and allowing the annunciator drum to remain in that indicating position until the nurse arrives at the patient's bedside and presses the resetting button 65 to restore the drum to the succeeding blank position where no indicating lamp circuits are closed and following which the auxiliary "nurse" indication may be later obtained. The blank position is indicated to the nurse as soon as the lamp 62 becomes extinguished.

The wall box light 62, the light 63 in the superintendent's office and the instrument light 16, which all apply to one transmitting device may have their lead wires 67 connected to the same contact finger 37. The room light 61 which may serve in common for a number of transmitting instruments in the same room or ward requires a separate contact finger with which it is connected by wire 68. Likewise the supply room light and other lights 64 connected by wire 69 require separate contact fingers as they are preferably connected in common with all the instruments on the floor.

By means of this invention the patient is enabled to signal at once his desires without necessitating the delay incident to requiring the nurse to go to the bedside of the patient in order to learn what is wanted. Furthermore, the signal as given remains until the signal system is reset by the nurse at the bedside after responding to the signal. The patient knows just what signal he has given because of the lighting of the indicating lamp in the push button holder and it is not necessary for him to learn a code of signals. If he desires to cancel a signal or to change it after it has been given it is only necessary for him to press the button again and so start the motor-driven annunciator drum in operation until the succeeding blank position is reached or the desired signal is indicated. A patient in a weakened condition may signal for a nurse by depressing the push button for a comparatively short period of time since such indication may be effected intermediately between each pair of the other signals.

The construction of the push button holder is such that the signal words may be read from either side thereof and the words may be so arranged that they are upright when either face of the push button holder is turned to the front while the device is held in the same hand, or so that one face reads correctly when the device is held in one hand and the other face when the device is held in the other hand.

Since the annunciator units are preferably installed in tiers it is desirable to keep down the height of the unit as much as possible and this is accomplished in the present instance by the disposition of the motor and the intermediate gear train, whereby the height of the device is only slightly greater than the diameter of the annunciator drum.

What I claim as new and desire to secure by Letters Patent is:

1. In a signaling system, a circuit including an electric motor, a signaling switch distant from the motor for closing the motor circuit, an annunciator driven by the electric motor for producing successive spaced signals while the motor circuit is closed and for producing a "nurse" signal recurrently after the others in the cycle of operation, and indicating circuits controlled by the annunciator for indicating at the place of the signaling switch the signal produced by the annunciator, whereby the signaling switch may be opened to stop the motor at the time when the desired signal is produced by the annunciator and whereby a "nurse" signal may be rapidly obtained.

2. In a signaling system, a rotatably mounted annunciator drum having blank positions and signaling positions, a motor in a motor circuit for slowly rotating the annunciator drum continuously while the motor circuit is closed, an insulated sleeve carried by said annunciator drum and carrying longitudinally extending contact ribs, contact fingers co-operating with said ribs, a push button holder mounted on a flexible cable, a push button for closing the motor circuit, and means on the push button holder included in circuits closed by said contact ribs and fingers in the various positions of the annunciator drum for indicating the signal produced by the annunciator drum, one set of the contact ribs on said annunciator drum being distributed and interposed between the other contact ribs for effecting a recurring "nurse" signal indication intermediate each pair of the other signal indications.

3. In a signaling system, the combination of rotary switching means movable to successive want signaling positions including an "attendant" signaling position recurrently after the others in the cycle of operation, electrically-controlled means including a signaling switch for effecting the operation of said rotary switching means, and indicating means including indicating circuits controlled by said switching means for indicating at the place of the signaling switch the signaling position of said switching means, whereby the signaling switch may be manipulated to produce the desired signal and whereby an "attendant" signal may be rapidly obtained.

4. In a signaling system, the combination, with an electric motor, of rotary switching means driven by said motor and movable thereby to successive want-signaling positions, said signaling positions including an "attendant" signaling position effected recurrently after the others in the cycle of operation for permitting the rapid attainment of said "attendant" signaling position, and indicating means co-operating with said switching means for producing want signals.

5. In a signaling system, the combination of signaling means for displaying any one of a plurality of cyclically-arranged want signals including an "attendant" signal to indicate to a nurse a want of a patient, means controlled by the patient for producing any one of said signals in a succession, and means for producing an attendant signal more frequently than the others to permit the rapid production of said attendant signal.

In testimony whereof, I affix my signature.

BORNETT L. BOBROFF.